Feb. 10, 1925.
J. A. CYPERT
1,525,571
IRRIGATING AND SPADING-FORK
Filed Aug. 11, 1924
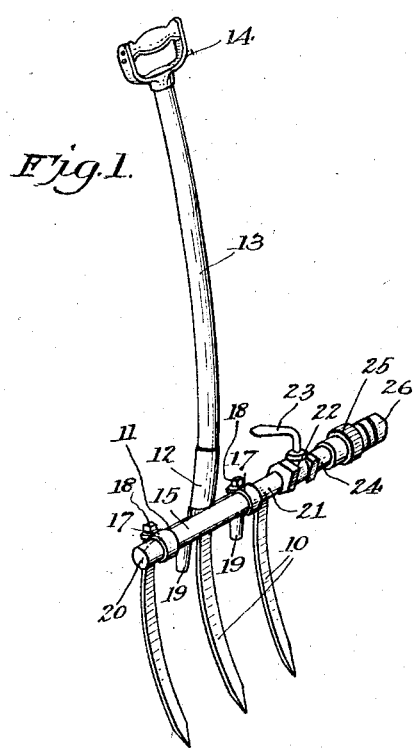
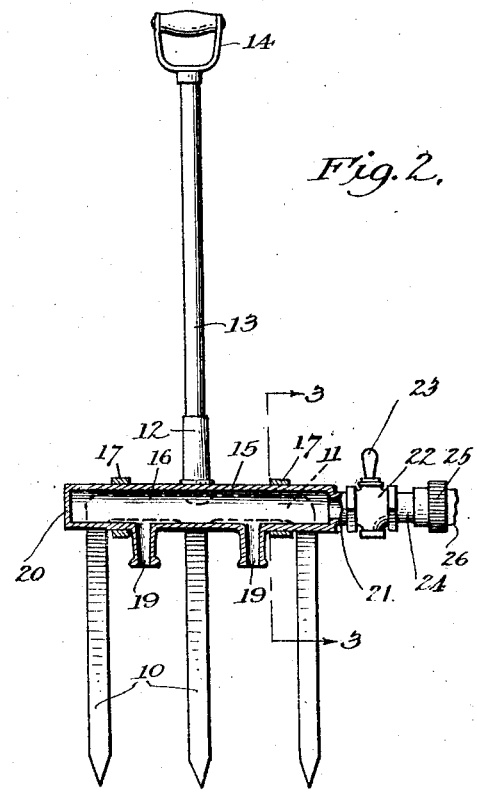
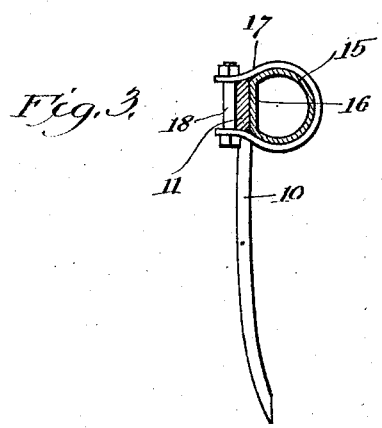
Inventor:
Joseph A. Cypert,
by Hazard and Miller
Attorneys Patented Feb. 10, 1925.

1,525,571

UNITED STATES PATENT OFFICE.

JOSEPH A. CYPERT, OF LOS ANGELES, CALIFORNIA.

IRRIGATING AND SPADING FORK.

Application filed August 11, 1924. Serial No. 731,447.

*To all whom it may concern:*

Be it known that I, JOSEPH A. CYPERT, a citizen of the United States, residing at Los Angeles, in the county of Los Angeles and State of California, have invented new and useful Improvements in Irrigating and Spading Forks, of which the following is a specification.

This invention relates to improvements in agricultural implements and in particular to spading tools.

It is an object of the invention to provide a spading tool with an irrigating attachment which may be operated together with the spading tool so as to soften hard ground to be spaded.

It is a further object of the invention to provide a spading tool with an irrigating attachment which will irrigate the ground spaded during the spading process and which may be easily and quickly turned on or off and the flow of water through the irrigating attachment may be regulated.

A still further object of the invention is to provide an irrigating attachment for spading devices which can easily and quickly be attached to spading tools of conventional form and cause now in use.

With the foregoing and other objects in view which will be made manifest in the following detailed description and pointed out in the appended claims, reference is had to the accompanying drawings for an illustrative embodiment of the invention, wherein—

Fig. 1, is a perspective view of the improved spading tool.

Fig. 2, is a front elevation of the tool shown in Fig. 1, the irrigating attachment being shown in vertical section.

Fig. 3, is a vertical section taken substantially on the line 3—3 of Fig. 2.

Referring to the accompanying drawings wherein similar reference characters designate similar parts throughout, the improved device consists of a conventional spading fork having tines 10 connected horizontally by a cross member 11, preferably formed integral with the tines 10, and which has formed integral therewith a socket 12 in which is secured the shank 13 carrying the conventional handle 14.

To the cross member 11 is secured a section of pipe or water conduit 15 which preferably has a flat back portion 16 so that the pipe may rest snugly against the cross member 11. The pipe 16 is secured to the cross member 11 by suitable brackets or their equivalent, as shown, as consisting of a band 17, the ends of which are joined upon the back of the cross member 11 by a bolt 18. At suitable spaced intervals upon the bottom side of the pipe 15, nipples or nozzles 19 are preferably formed integral therewith so that water from within the pipe 15 may be directed downwardly and in the present embodiment of the invention, these nipples 19 are preferably so spaced as to direct the water between the tines 10.

As shown in Fig. 2, one end of the pipe 15 is closed as at 20 while the other is provided with a nipple 21 which is threaded to receive a valve 22 of ordinary construction having a handle 23 adapted to be turned a quarter of a revolution to open or close the valve. On the opposite side of the valve 22, a second nipple 24 is secured by threaded attachment and this nipple 24 is provided with a coupling member 25 adapted to be secured to the ordinary garden hose 26.

As shown in Fig. 2, the valve 22 is disposed beyond the side of the spading fork so as not to interfere with the gardener placing his foot upon the back portion upon the cross member 11 upon thrusting the spading fork into the ground. At the same time the valve 22 is disposed close enough to the spading fork so that it may be easily and quickly turned with the foot so as to either shut off, turn on the water or regulate the flow.

From the above it is seen that I have provided an irrigating attachment for conventional spading implements which may be easily and quickly attached and which will be firmly secured thereon against sliding by means of the flattened portion 16 and the rugged band 17.

It is to be understood that various changes may be made in the details of construction without departing from the spirit or scope of the invention as defined by the appended claims.

What I claim is:

1. In combination with a spading fork, a section of pipe having a nozzle secured to said fork, said nozzle being disposed between the tines of said fork.

2. In combination with a spading fork, a pipe section secured to said fork upon its cross member, nozzles formed upon said pipe and disposed between the tines of said fork, and a valve associated with said pipe for regulating the fluid flow therethru.

3. In combination with a spading tool, a pipe section detachably secured to said tool and disposed in approximately horizontal position, means for admitting a fluid into said pipe section, and means for discharging said fluid downwardly from said pipe section.

4. A spading fork comprising a handle, a cross bar secured to said handle, tines extending downwardly from said cross bar, a conduit secured to said cross bar, means for admitting a fluid to said conduit, and means for discharging said fluid downwardly adjacent said tines.

5. A spading fork comprising a handle, a cross bar secured to said handle, tines extending downwardly from said cross bar, a conduit adapted to fit against said cross bar, means including a band for detachably securing said conduit to said cross bar, means for admitting fluid to said conduit, and means for discharging said fluid downwardly against said tines.

In testimony whereof I have signed my name to this specification.

JOSEPH A. CYPERT.